US008820177B2

(12) United States Patent
Morris et al.

(10) Patent No.: US 8,820,177 B2
(45) Date of Patent: Sep. 2, 2014

(54) FLOW MEASUREMENT UNIT

(75) Inventors: Gerald R. Morris, Elmwood, IL (US); Daniel A. Spurgeon, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 220 days.

(21) Appl. No.: 13/407,951

(22) Filed: Feb. 29, 2012

(65) Prior Publication Data
US 2013/0220026 A1  Aug. 29, 2013

(51) Int. Cl.
*G01F 1/34* (2006.01)
(52) U.S. Cl.
USPC .......................................... 73/861.42
(58) Field of Classification Search
USPC .............. 73/861.52, 861.53, 861.42
See application file for complete search history.

(56) References Cited

U.S. PATENT DOCUMENTS

| | | | | |
|---|---|---|---|---|
| 3,719,079 A * | 3/1973 | Howell | ........................ | 73/861.71 |
| 4,993,269 A * | 2/1991 | Guillaume et al. | ........ | 73/861.53 |
| 5,086,655 A * | 2/1992 | Fredericks et al. | ........ | 73/861.61 |
| 5,134,890 A * | 8/1992 | Abrams | ........................ | 73/861.52 |
| 6,128,963 A * | 10/2000 | Bromster | ................... | 73/861.52 |
| 6,151,557 A | 11/2000 | Broden | | |
| 6,546,812 B2 * | 4/2003 | Lewis | ........................ | 73/861.63 |
| 6,681,643 B2 * | 1/2004 | Heinonen | ................... | 73/861.52 |
| 6,945,123 B1 * | 9/2005 | Kuehl et al. | ................ | 73/861.42 |
| 7,219,558 B1 | 5/2007 | Bowman | | |
| 7,360,446 B2 * | 4/2008 | Dai et al. | .................... | 73/861.19 |
| 7,363,182 B2 | 4/2008 | Tison | | |
| 7,597,009 B1 | 10/2009 | VandeBerg | | |
| 8,393,227 B2 * | 3/2013 | Itoh et al. | ................... | 73/861.42 |

FOREIGN PATENT DOCUMENTS

WO  03100391 A1  12/2003

OTHER PUBLICATIONS http://www.omega.com/literature/transactions/volume4/T9904-07-DIFF.html, 1995.

* cited by examiner

*Primary Examiner* — Jewel V Thompson
(74) *Attorney, Agent, or Firm* — Jeff A. Greene

(57) ABSTRACT

A flow measurement unit for measuring a rate of airflow for a ventilation system. The flow measurement unit includes a flow measurement device installed in a housing. A first and a second pressure gauge are provided anteriorly and posteriorly, respectively, to the flow measurement device. The first and the second pressure gauge are configured to provide a first pressure reading, corresponding to the first pressure, and a second pressure reading, corresponding to the second pressure of airflow. Further, the flow measurement unit includes a fan to adjust airflow, such that the second pressure approaches the first pressure of airflow.

20 Claims, 4 Drawing Sheets

FLOW MEASUREMENT UNIT

TECHNICAL FIELD

The present disclosure relates to a flow measurement unit for a ventilation system, and to a method for measuring a rate of airflow in the ventilation system.

BACKGROUND

Typically, a rate of airflow is measured by using flow measurement devices, like anemometer. However, while measuring the rate of airflow, the flow measurement device provides a restriction to the same airflow. This may result in a pressure drop in airflow across the flow measurement device and leads to an error in the measurement of the rate of airflow by the flow measurement device.

U.S. Pat. No. 7,363,182 discloses a method for measurement of a rate of airflow. The method uses device-specific information, such as, a calibration data table for correcting measurements of the rate of airflow. The method includes sensing airflow and providing means to compute a measured fluid flow based on the sensed airflow and correcting the measured airflow based on the device-specific calibration data. However, in certain cases, the size of the calibration data table may not be large enough to correct the measurements over a wide range of the measured rate of airflow.

SUMMARY

In one aspect, the present disclosure provides a method for measuring a rate of airflow for a ventilation system. The method includes providing a flow measurement device in airflow. A first pressure of airflow upstream to the flow measurement device is measured. Also, a second pressure of airflow downstream to the flow measurement device is measured. The method further includes adjusting airflow, such that the second pressure approaches the first pressure of airflow.

In another aspect, the present disclosure provides the flow measurement unit for measuring the rate of airflow. The flow measurement unit includes the housing and the flow measurement device installed in the housing. A first pressure gauge and a second pressure gauge are provided anteriorly and posteriorly, respectively to the flow measurement device in the housing. The first pressure gauge and the second pressure gauge are configured to provide a first pressure reading, corresponding to the first pressure and a second pressure reading, corresponding to the second pressure of airflow. Further, the flow measurement unit includes the fan to adjust airflow based at least on one of the first pressure reading and the second pressure reading.

Other features and aspects of this disclosure will be apparent from the following description and the accompanying drawings.

DETAILED DESCRIPTION

The present disclosure relates to a method and an apparatus for measurement of a rate of airflow. In particular, the present disclosure provides an improved method for measuring the rate of airflow in a ventilation system. The disclosure will now be described in detail with reference being made to accompanying figures.

Figure 1:
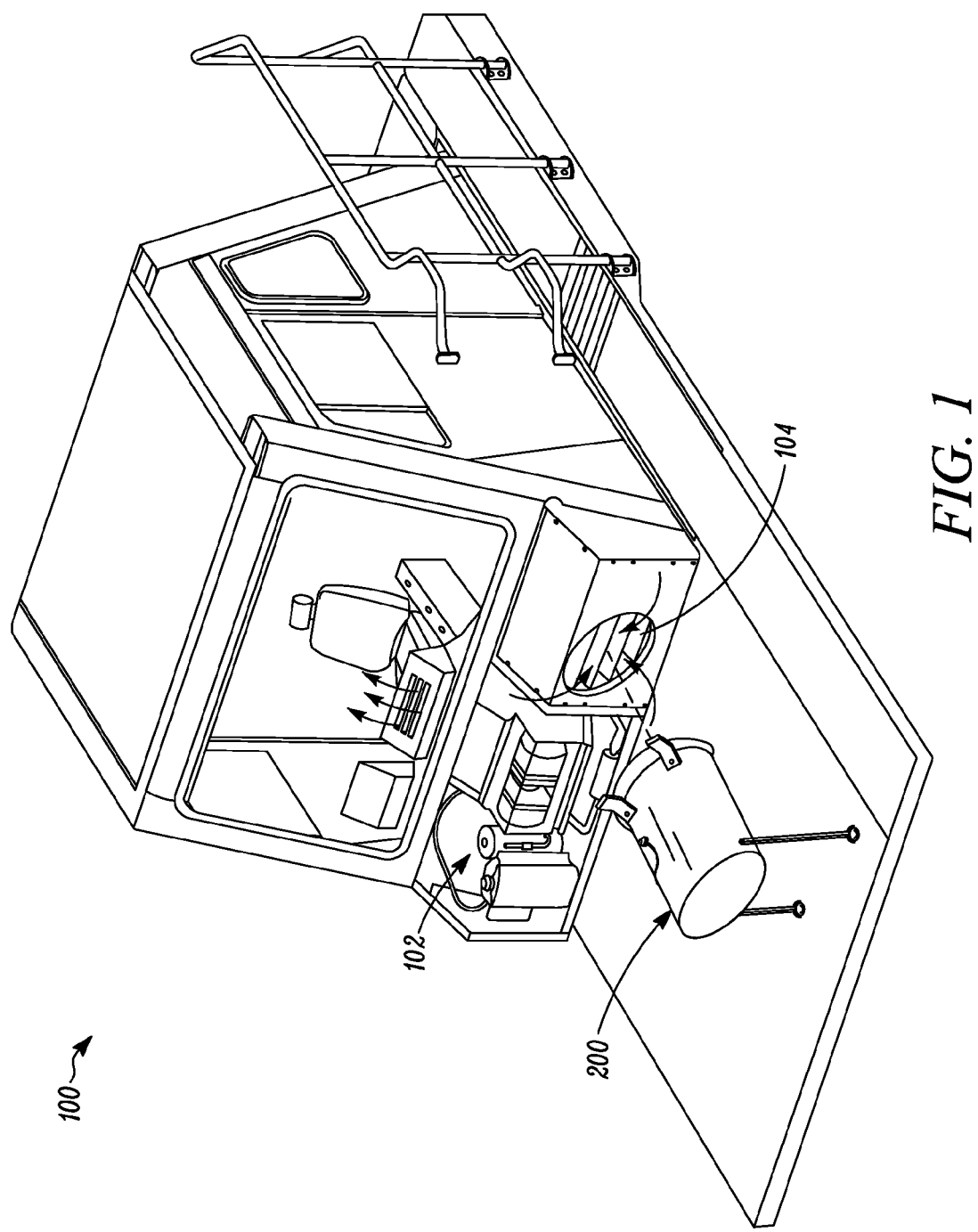
FIG. 1 illustrates a perspective view of an operator cab having a ventilation system, and a flow measurement unit for the ventilation system.

FIG. 1 illustrates an operator cab 100 defined in the form of an enclosure, which may be associated with a machine (not illustrated). The machine may be an earth moving machine used in industries like mining, agriculture or construction, for example, a wheel loader, an excavator, a motor grader, a cold planer, a front loader, a backhoe loader, a track-type vehicle, an off-highway truck, on-highway trucks, and the like.

The operator cab 100 may include an operator seat, and one or more control means to control various functions associated with the machine. It may be apparent to a person with ordinary skill in the art, that the operator cab 100 may include a steering device, dials, levers, a user interface, and the like to control the various functions of the machine.

As illustrated in FIG. 1, the operator cab 100 may be provided with a ventilation system 102. In one exemplary configuration, the ventilation system 102 may be disposed adjacent to the operator cab 100. As illustrated in FIG. 1, the ventilation system 102 may be operatively positioned towards a front side of the operator cab 100. However, it can be contemplated that the ventilation system 102 may be disposed at any suitable location, relative to the operator cab 100, based on the space and size constraints in the machine.

The ventilation system 102 may be either one of an air-conditioning unit or a heating unit. The ventilation system 102 may be, for example, a heating, venting, and air-conditioning system (HVAC unit) with a single, integral, electrical module. Alternatively, the ventilation system 102 may be separate air-conditioning and heating units, each separately powered by a power source disposed in the machine. The ventilation system 102 may typically include an evaporator coil, and a heater coil which function together to condition the airflow in the operator cab 100.

The ventilation system 102 may be configured to regulate a flow of air circulating within the operator cab 100. Further, the ventilation system 102 may provide a flow of fresh air, hereinafter referred to as airflow, in the operator cab 100. The ventilation system 102 may provide airflow (shown by arrows in FIG. 1) via one or more ducts positioned within the operator cab 100. For this purpose, the ventilation system 102 may include an inlet vent 104, opened to the atmosphere, to draw in airflow. A suction fan (not illustrated) disposed downstream to the inlet vent 104 may help to draw in airflow, from the atmosphere, in the ventilation system 102, which further be passed to the operator cab 100.

According to the present disclosure, FIG. 1 also illustrates a flow measurement unit 200. The flow measurement unit 200 may be configured to measure a rate of airflow, supplied to the operator cab 100 via the ventilation system 102. As illustrated in FIG. 1, the flow measurement unit 200 is configured to be mounted over the inlet vent 104 of the operator cab 100.

Figure 2:
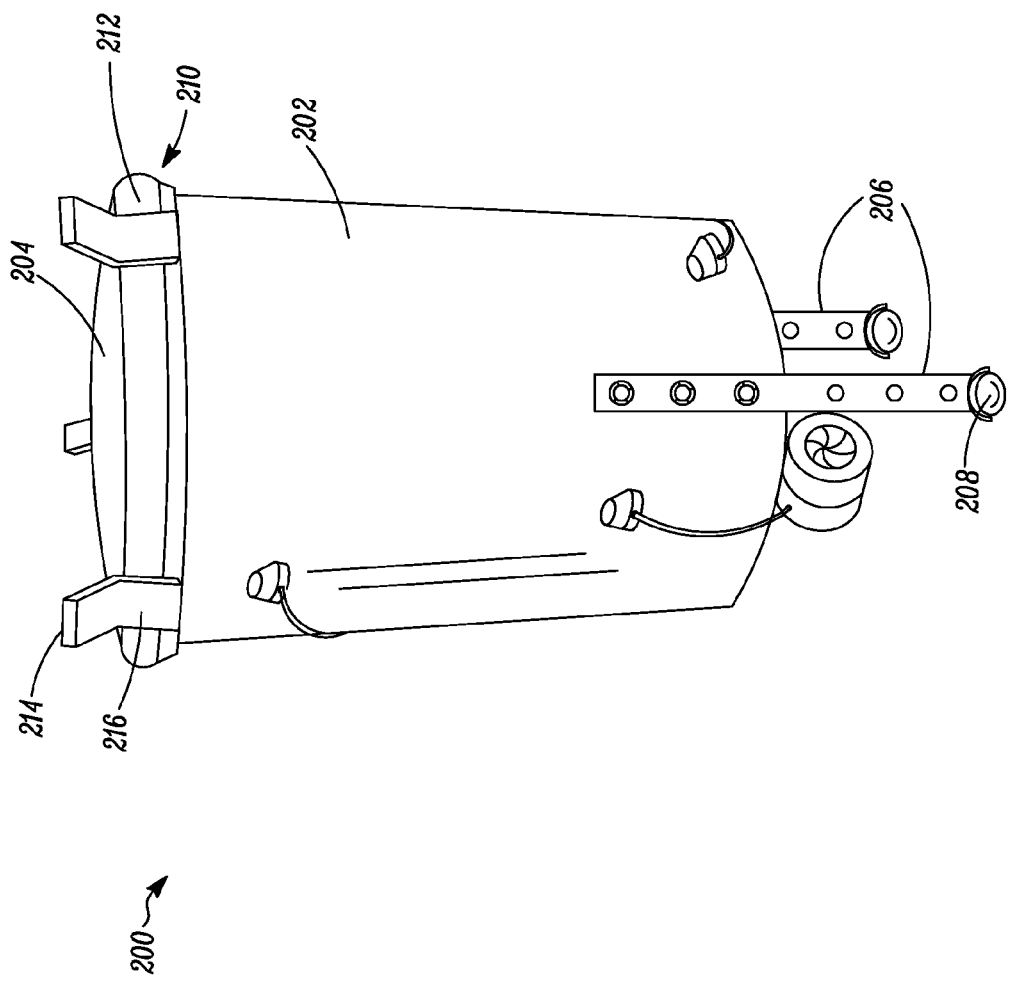
FIG. 2 illustrates a perspective view of the flow measurement unit of FIG. 1, according to an aspect of the present disclosure.

FIG. 2 illustrates a perspective view of the flow measurement unit 200, according to an aspect of the present disclosure. The flow measurement unit 200 may include a housing 202, which may provide space for installation of various components of the flow measurement unit 200. In an exemplary configuration, the housing 202 may be in the shape of a hollow cylinder. However, it may be contemplated that the housing 202 may be formed in any suitable shape for mounting of the flow measurement unit 200 over the inlet vent 104 of the ventilation system 102. In particular, a mouth portion 204 of the housing 202 may be adapted to be placed over the inlet vent 104 of the ventilation system 102.

Further, the flow measurement unit 200 may include one or more legs 206, to support the flow measurement unit 200 over the ground. The one or more legs 206 may be pivotally connected to the housing 202, such that the housing 202 may be suitably rotated to align the mouth portion 204 with the inlet vent 104 of the ventilation system 102. Further, the one or more legs 206 may include caster wheels 208, disposed at a bottom end of the one or more legs 206, to conveniently move the flow measurement unit 200.

As illustrated, the flow measurement unit 200 may also include supporting means 210 to mount the flow measurement unit 200 over the ventilation system 102. The supporting means 210 may include a bulb seal 212 annularly disposed about the mouth portion 204 of the housing 202. The bulb seal 212 may provide an air-tight seal between the flow measurement unit 200 and the inlet vent 104 of the ventilation system 102.

Further, the supporting means 210 may include one or more magnets 214 disposed near the mouth portion 204 of the housing 202. For example, the magnets 214 may be supported on the housing 202 via angle brackets 216 firmly attached to the housing 202 using nuts and bolts. However, the angle brackets 216 may be attached to the housing 202 by any suitable process, such as welding or the like, known in the art. The magnets 214 may firmly hold the flow measurement unit 200 during mounting with the ventilation system 102.

Figure 3:
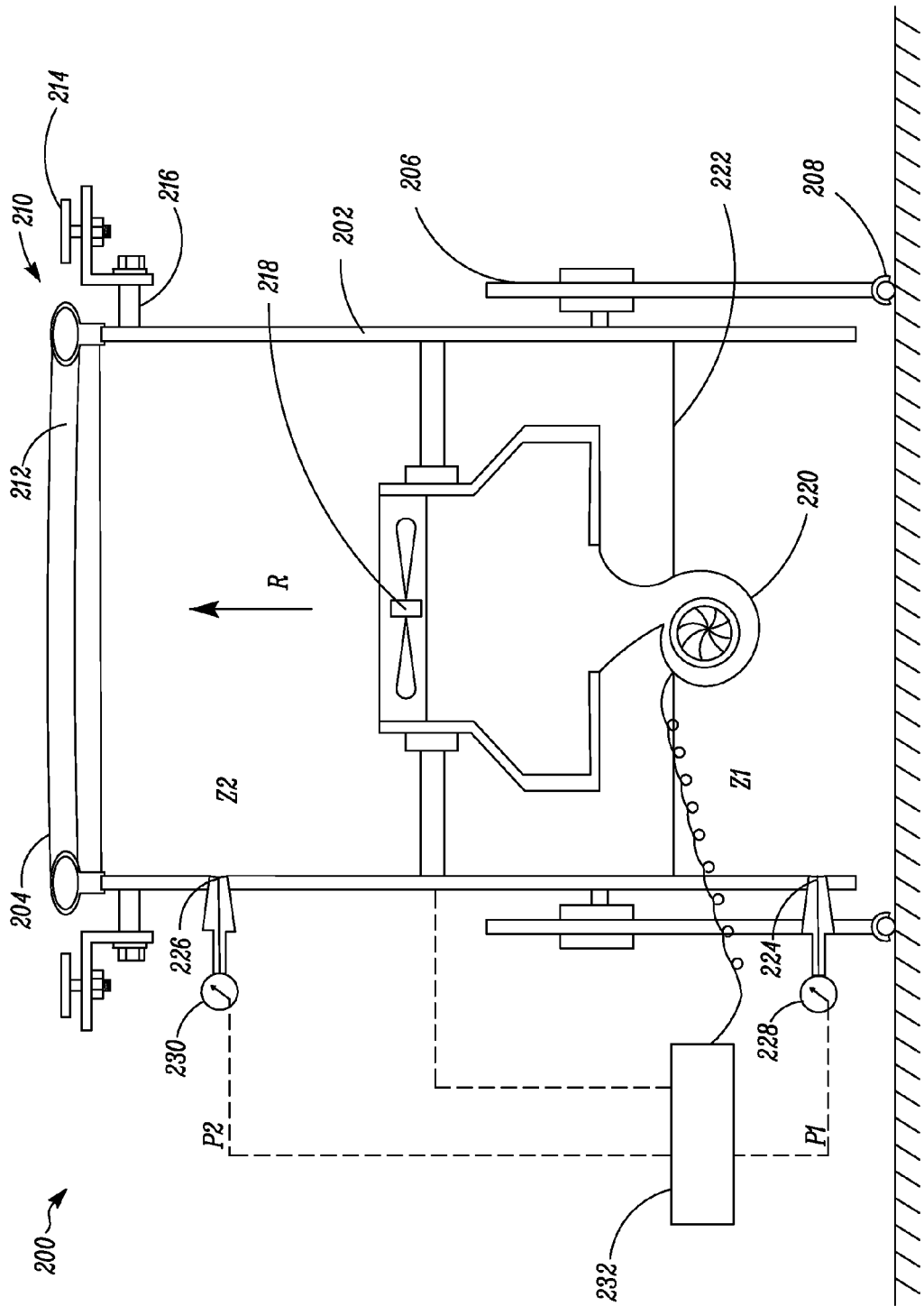
FIG. 3 illustrates a schematic sectional view of the flow measurement unit, according to an aspect of the present disclosure.

Referring now to FIG. 3, a schematic sectional view of the flow measurement unit 200 is illustrated. According to an embodiment of the present disclosure, the flow measurement unit 200 may include a flow measurement device 218 installed in the housing 202. The flow measurement unit 200 may be configured to measure a rate of airflow in the flow measurement unit 200.

For the purpose of the present disclosure, the flow measurement device 218 may be a positive displacement flowmeter, such as, an anemometer. Specifically, the flow measurement device 218 may be a rotation anemometer, such as, a cup anemometer or a vane anemometer. However, it may be contemplated that, in other embodiments, the flow measurement device 218 may be any other velocity based anemometer, for example, a hot-wire anemometer, a sonic anemometer, a windmill anemometer, etc.

The flow measurement unit 200 may also include a fan 220 disposed upstream to the flow measurement device 218 relative to a direction of airflow R. The fan 220 may be configured to aid in movement of the flow of air through the flow measurement unit 200, and in the process may raise the pressure of airflow. Further, the fan 220 may provide a draft to adjust airflow, to help in correct measurement of the rate of airflow by the flow measurement unit 200. For the purpose of the present disclosure, the fan 220 may be a variable speed radial fan, for example, a squirrel-cage fan. Although, any axial fan or other type of fans may be employed without departing from the scope of the present disclosure.

As the air passes through the flow measurement device 218, the pressure of airflow may change due to the restriction created by the flow measurement device 218. This creates a first pressure zone Z1 upstream to the flow measurement device 218, afore the fan 220, having a first pressure, and a second pressure zone Z2 downstream to the flow measurement device 218 having a second pressure. The first and the second pressure zones Z1, Z2 may be separated over a segregation wall 222 in the housing 202 of the flow measurement unit 200.

The flow measurement unit 200 may include a first pressure port 224 and a second pressure port 226 provided in the first and the second pressure zones Z1, Z2 respectively. Specifically, the first pressure port 224 may be provided anteriorly to the flow measurement device 218 in the direction of airflow R, afore the fan 220 in the housing 202. Similarly, the second pressure port 226 may be provided posteriorly to the flow measurement device 218, in the direction of airflow R, in the housing 202 of the flow measurement unit 200.

Further, the flow measurement unit 200 may include a first pressure gauge 228 and a second pressure gauge 230 installed on the first pressure port 224 and the second pressure port 226, respectively. The first and second pressure gauges 228, 230 may be configured to provide a first pressure reading P1 and a second pressure reading P2, corresponding to the pressure of airflow, in the first and second pressure zones Z1, Z2 respectively. The first and second pressure gauges 228, 230 may be any one of the hydrostatic pressure measuring instruments such as Bourdon gauge, McLeod gauge or electronic pressure sensors such as piezo-resistive strain gauge, capacitive gauge, optical gauge, thermal gauge, etc.

In an embodiment, the flow measurement unit 200 may also include a controller 232 in connection with the first and the second pressure gauges 228, 230, to receive the first pressure reading P1 and the second pressure reading P2 in the form of signals and process the signals based on predefined instructions. Further, the controller 232 may be in communication with the fan 220, in order to regulate the fan 220, so as to provide the draft to adjust airflow in flow measurement unit 200, based at least on one of the first pressure reading P1 and the second pressure reading P2. It may be apparent that the controller 232 may be a combination of, but not limited to, for example, a set of instructions, a Random Access Memory (RAM), a Read Only Memory (ROM), flash memory, a data structure, and the like.

Industrial Applicability

Machines employed in industries, such as agriculture, construction and mining are frequently operated in less than ideal environmental conditions. For example, such machines are often operated in uncomfortably warm or cold weather, or in dusty conditions because of the nature of the work being done by the machines. It has thus been desired that the operator cab 100 in these machines may be provided with fresh air for the comfort of the operator. For this purpose, these machines are provided with a ventilation system, such as the ventilation system 102 of the present disclosure.

The regulations, set forth, require that airflow from the ventilation system 102 may be monitored at a frequent interval, to ensure the proper working of the ventilation system 102. In particular, the rate of airflow needs to be measured to assure that the supply of the fresh airflow falls within the standards set by the regulations. Further, the flow-rate may need to be measured, so that the ventilation system 102 may be tuned for improved performance and providing greater comfort level to the operator in the operator cab 100.

Typically, the rate of airflow is measured by using flow measurement device like anemometer. However, during measurement of the rate of airflow, the flow measurement device may pose as a restriction to the flow of air, for which the flow rate needs to be measured. This results in a pressure drop in the flow of air about the flow measurement device, changing the characteristics of airflow. All this may lead to a faulty measurement of the flow rate by the conventional flow measurement device.

The flow measurement unit 200 of the present disclosure, using a combination of various components, provides a measurement of the rate of airflow for the ventilation system 102, compensating for the effect of the restriction created by the flow measurement device 218 in the flow measurement unit 200. Thus, the flow measurement unit 200 may provide substantially accurate measurement of the rate of airflow over the conventional methods known in the art.

Further, the flow measurement unit 200 using readily available components, such as, a bucket for housing 202 may be cheap to manufacture. In addition, the flow measurement unit 200 may be portably transported to a desired location, for example, to mount over the ventilation system 102, due to the caster wheels 208 provided with the one or more legs 206. Further, with the one or more legs 206 having a pivot connection with the housing 202, the flow measurement unit 200 may be conveniently be adjusted to mount over the ventilation system 102.

The supporting means 210 may help in easy mounting of the flow measurement unit 200 over the inlet vent 104 of the ventilation system 102. The bulb seal 212 of the supporting means 210 may provide the air-tight seal between the flow measurement unit 200 and the ventilation system 102, required for accurate measurement of the rate of airflow. And, the magnets 214 of the supporting means 210 may help to securely hold the flow measurement unit 200 with the ventilation system 102.

Figure 4:
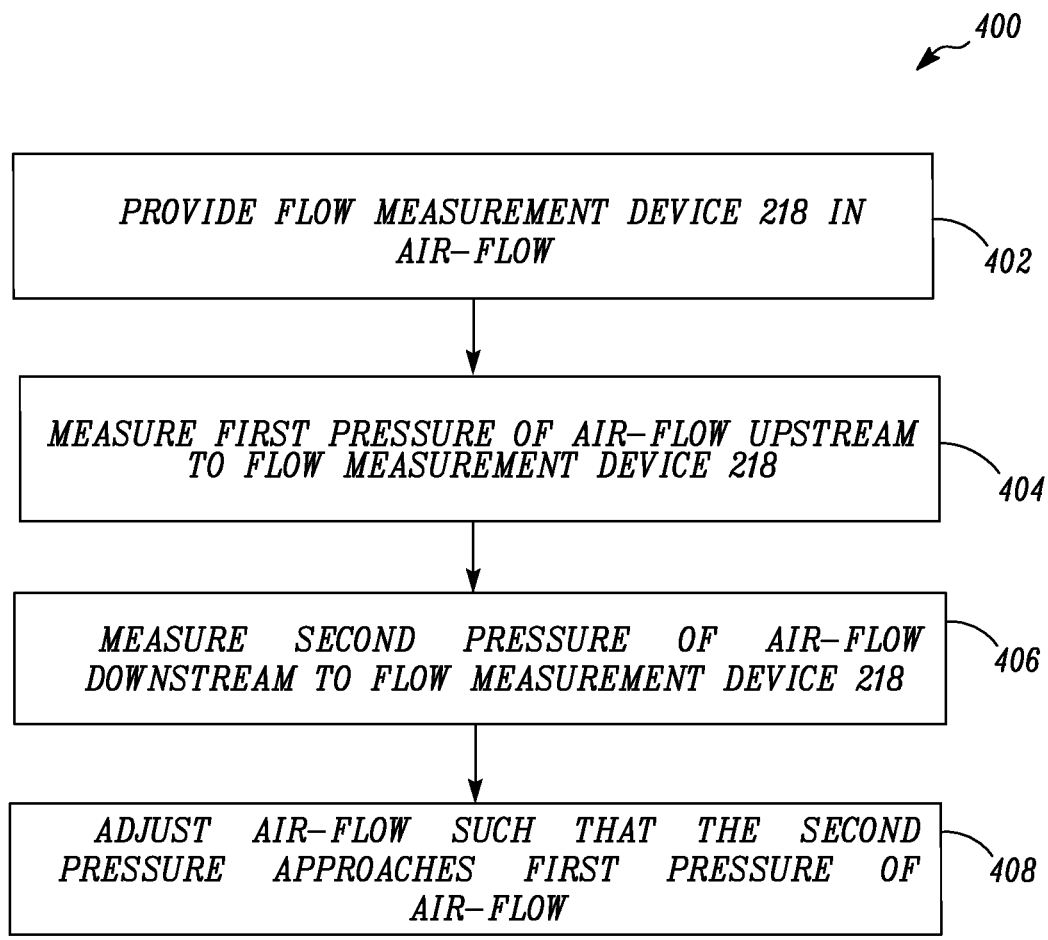
FIG. 4 illustrates a process flow diagram depicting a method for measurement of a rate of airflow for the ventilation system.

The process flow 400, as illustrated in FIG. 4, depicts a method for measuring the rate of airflow for the ventilation system 102. As illustrated, in step 402, the flow measurement device 218 is provided in airflow. The flow measurement device 218 may be disposed, as such, that the axis of rotation of the flow measurement device 218 is parallel to the direction of airflow R.

Further, in step 404 of the process flow 400, the first pressure of the airflow is measured upstream to the flow measurement device 218, afore the fan 220. The first pressure is measured by the first pressure gauge 228 disposed in the first pressure zone Z1 of the housing 202. Similarly, in step 406, the second pressure of airflow is measured downstream to the flow measurement device 218. This is done by the second pressure gauge 230 disposed in the second pressure zone Z2 of the housing 202. The first and the second pressure gauges 228, 230 provide the first and the second pressure readings P1, P2, respectively, which may be received by the controller 232.

Finally, in step 408, the airflow is adjusted such that the second pressure approaches the first pressure of airflow, that is, a pressure difference of the first pressure, in the first pressure zone Z1, and the second pressure, in the second pressure zone Z2, approaches zero inches of water. This is achieved by regulating the fan 220 by the controller 232 in the flow measurement unit 200. The controller 232 may perform calculations to compare the first pressure reading P1 and the second pressure reading P2. Further, the controller 232 regulates the fan 220 to provide a draft to airflow, until the second pressure reading P2 is substantially equal to the first pressure reading P1.

In the above process, the flow measurement unit 200 of the present disclosure may attempt to re-produce the same conditions in the first pressure zone Z1 and the second pressure zone Z2, compensating the pressure drop or the effect of the restriction due to the flow measurement device 218. This results in a substantially correct measurement of the rate of flow airflow by the flow measurement device 218 in the flow measurement unit 200.

In an embodiment, when the ambient air is used as airflow for the ventilation system 102, the first pressure gauge 228 along with the first pressure port 224 may be eliminated, as the first pressure is known to be the atmospheric pressure. Further, the fan 220 may need to adjust airflow such that the second pressure P2 in the second pressure zone Z2 may approach the atmospheric pressure.

Although the embodiments of this disclosure as described herein may be incorporated without departing from the scope of the following claims, it will be apparent to those skilled in the art that various modifications and variations can be made. Other embodiments will be apparent to those skilled in the art from consideration of the specification and practice of the disclosure. It is intended that the specification and examples be considered as exemplary only, with a true scope being indicated by the following claims and their equivalents.

What is claimed is:

1. A method for measuring a rate of air-flow for a ventilation system, the method comprising:
providing a flow measurement device in air-flow;
measuring a first pressure of air-flow upstream to the flow measurement device;
measuring a second pressure of air-flow downstream to the flow measurement device; and
adjusting air-flow such that the second pressure approaches the first pressure of air-flow.

2. The method of claim 1, wherein providing the flow measurement device includes providing an anemometer.

3. The method of claim 1, wherein measuring the first pressure includes providing a first pressure gauge anteriorly to the flow measurement device.

4. The method of claim 1, wherein measuring the second pressure includes providing a second pressure gauge posteriorly to the flow measurement device.

5. The method of claim 1, wherein measuring the first pressure and the second pressure further includes receiving a first pressure reading and a second pressure reading, corresponding to the first pressure and the second pressure, respectively, by a controller.

6. The method of claim 5, wherein adjusting air-flow includes providing a fan in communication with the controller.

7. The method of claim 6, wherein adjusting air-flow further includes regulating the fan by the controller based at least on one of the first pressure reading and the second pressure reading.

8. The method of claim 7, wherein adjusting air-flow further includes providing a draft to air-flow by the fan.

9. A flow measurement unit for a ventilation system, the flow measurement unit comprising:
a housing;
a flow measurement device installed in the housing, the flow measurement device configured to measure a rate of air-flow for the ventilation system;
a first pressure gauge provided in the housing anteriorly to the flow measurement device, the first pressure gauge is configured to measure a first pressure of air-flow;
a second pressure gauge provided in the housing posteriorly to the flow measurement device, the second pressure gauge is configured to measure a second pressure of air-flow; and
a fan disposed in the housing, the fan is configured to adjust air-flow such that the second pressure approaches the first pressure of air-flow.

10. The flow measurement unit of claim 9, wherein the flow measurement unit includes supporting means to be mounted to the ventilation system.

11. The flow measurement unit of claim 10, wherein the supporting means includes a bulb seal to provide a substantially air-tight seal between the flow measurement unit and the ventilation system.

12. The flow measurement unit of claim 10, wherein the supporting means includes magnets to hold the flow measurement unit with the ventilation system.

13. The flow measurement unit of claim 9, wherein the flow measurement device is an anemometer.

14. The flow measurement unit of claim 9, wherein the first pressure gauge provides a first pressure reading, corresponding to the first pressure of air-flow, and the second pressure gauge provides a second pressure reading, corresponding to the second pressure of air-flow.

15. The flow measurement unit of claim 14 further includes a controller configured to compare the first pressure reading and the second pressure reading.

16. The flow measurement unit of claim 15, wherein the controller is further configured to regulate the fan to provide a draft to air-flow, based on the comparison of the first pressure reading and the second pressure reading.

17. A flow measurement unit for measuring a rate of air-flow for a ventilation system, associated with an operator cab in a machine, the flow measurement unit comprising:

a housing adapted to be mounted over the ventilation system;
a flow measurement device installed in the housing, the flow measurement device configured to measure the rate of air-flow;
a first pressure gauge provided in the housing anteriorly to the flow measurement device, the first pressure gauge is configured to provide a first pressure reading corresponding to a first pressure of air-flow;
a second pressure gauge provided in the housing posteriorly to the flow measurement device, the second pressure gauge is configured to provide a second pressure reading corresponding to a second pressure of air-flow;
a controller configured to compare the first pressure reading and the second pressure reading; and
a fan disposed in the housing anteriorly to the flow measurement device, the fan being regulated by the controller to provide a draft to air-flow, such that air-flow is adjusted to have the second pressure approaching the first pressure of air-flow.

18. The flow measurement unit of claim 17, wherein the flow measurement device is a cup anemometer.

19. The flow measurement unit of claim 17, wherein the housing includes supporting means to mount over the ventilation system.

20. The flow measurement unit of claim 19, wherein the supporting means includes any of a bulb seal, magnets.

* * * * *

UNITED STATES PATENT AND TRADEMARK OFFICE
CERTIFICATE OF CORRECTION

| | | |
|---|---|---|
| PATENT NO. | : 8,820,177 B2 | Page 1 of 1 |
| APPLICATION NO. | : 13/407951 | |
| DATED | : September 2, 2014 | |
| INVENTOR(S) | : Morris et al. | |

It is certified that error appears in the above-identified patent and that said Letters Patent is hereby corrected as shown below:

In the Specification

Column 4, line 42, delete "Industrial Applicability" and insert -- INDUSTRIAL APPLICABILITY --.

Signed and Sealed this
Fifteenth Day of September, 2015

Michelle K. Lee
*Director of the United States Patent and Trademark Office*